United States Patent [19]

Hildebrand

[11] Patent Number: 4,459,932
[45] Date of Patent: Jul. 17, 1984

[54] ALL-TERRAIN AND AMPHIBIOUS AUTOMOTIVE VEHICLE

[76] Inventor: Georges Hildebrand, 2, rue Heckler, Strasbourg (Bas-Rhin), France

[21] Appl. No.: 353,030

[22] Filed: Mar. 1, 1982

[30] Foreign Application Priority Data

Feb. 27, 1981 [FR] France ................ 81 04379
Jun. 29, 1981 [FR] France ................ 81 13058

[51] Int. Cl.³ .................. B62D 55/04; B63B 35/00
[52] U.S. Cl. ........................... 114/270; 180/9.26
[58] Field of Search ........... 180/9.26, 9.28, 9.32, 180/DIG. 2, 72; 114/270; 305/35 R, 41, 43

[56] References Cited

U.S. PATENT DOCUMENTS

| 1,470,283 | 10/1923 | Opitz | 180/906 |
| 2,173,793 | 9/1939 | Doblhoff | 180/9.3 |
| 2,287,290 | 6/1942 | Brown | 180/9.28 |
| 2,514,488 | 7/1950 | Hale et al. | 114/270 |
| 2,992,862 | 7/1961 | Fredricks et al. | 305/56 |
| 3,062,327 | 11/1962 | Debus | 188/5 |
| 3,452,702 | 7/1969 | Slemmons | 114/270 |
| 3,921,743 | 11/1975 | Parrish | 180/9.2 C |
| 3,930,553 | 1/1976 | Kopera et al. | 180/9.28 |
| 3,958,839 | 5/1976 | Nodwell | 305/35 R |
| 3,976,153 | 8/1976 | Lateur | 180/9.2 C |
| 4,204,583 | 5/1980 | Toyoura et al. | 180/9.28 |

FOREIGN PATENT DOCUMENTS

| 1140180 | 7/1957 | France . | |
| 1197800 | 12/1959 | France . | |
| 1339378 | 8/1963 | France . | |
| 1448586 | 6/1966 | France . | |
| 1480408 | 4/1967 | France . | |
| 1525912 | 4/1968 | France . | |
| 2348830 | 11/1977 | France . | |
| 2366981 | 5/1978 | France . | |
| 2454949 | 11/1980 | France . | |
| 477798 | 1/1938 | United Kingdom . | |
| 864650 | 4/1961 | United Kingdom . | 114/270 |
| 1138109 | 12/1968 | United Kingdom . | |

Primary Examiner—John A. Pekar
Assistant Examiner—D. Lynn Fugate
Attorney, Agent, or Firm—Young & Thompson

[57] ABSTRACT

An all-terrain and amphibious automotive vehicle is provided by simple modification of an existing automotive vehicle. Supplemental axles have independent wheels which can be raised when not needed. An endless track is trained over the wheels on each side of the vehicle. Inflatable members (11–13) are secured to the chassis along its longitudinal edges and at the front and the rear of the chassis, and a further inflatable element (10) beneath the chassis serves as a float for the vehicle. The power-driven wheels (6') are interconnected with the other wheels (6) by means of sprockets (16) and transmission chains (17) as well as by a clutch (18) on the driven axle (1). It is possible to brake at least one of the power-driven wheels (6') to steer the vehicle by driving.

10 Claims, 6 Drawing Figures

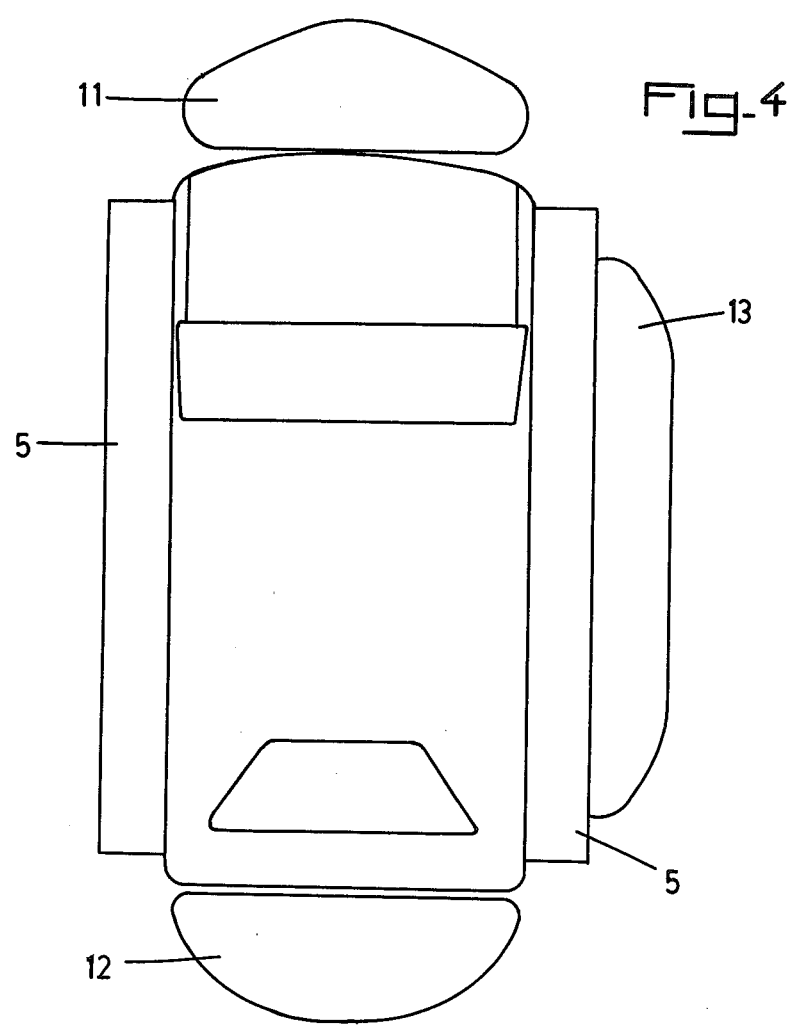

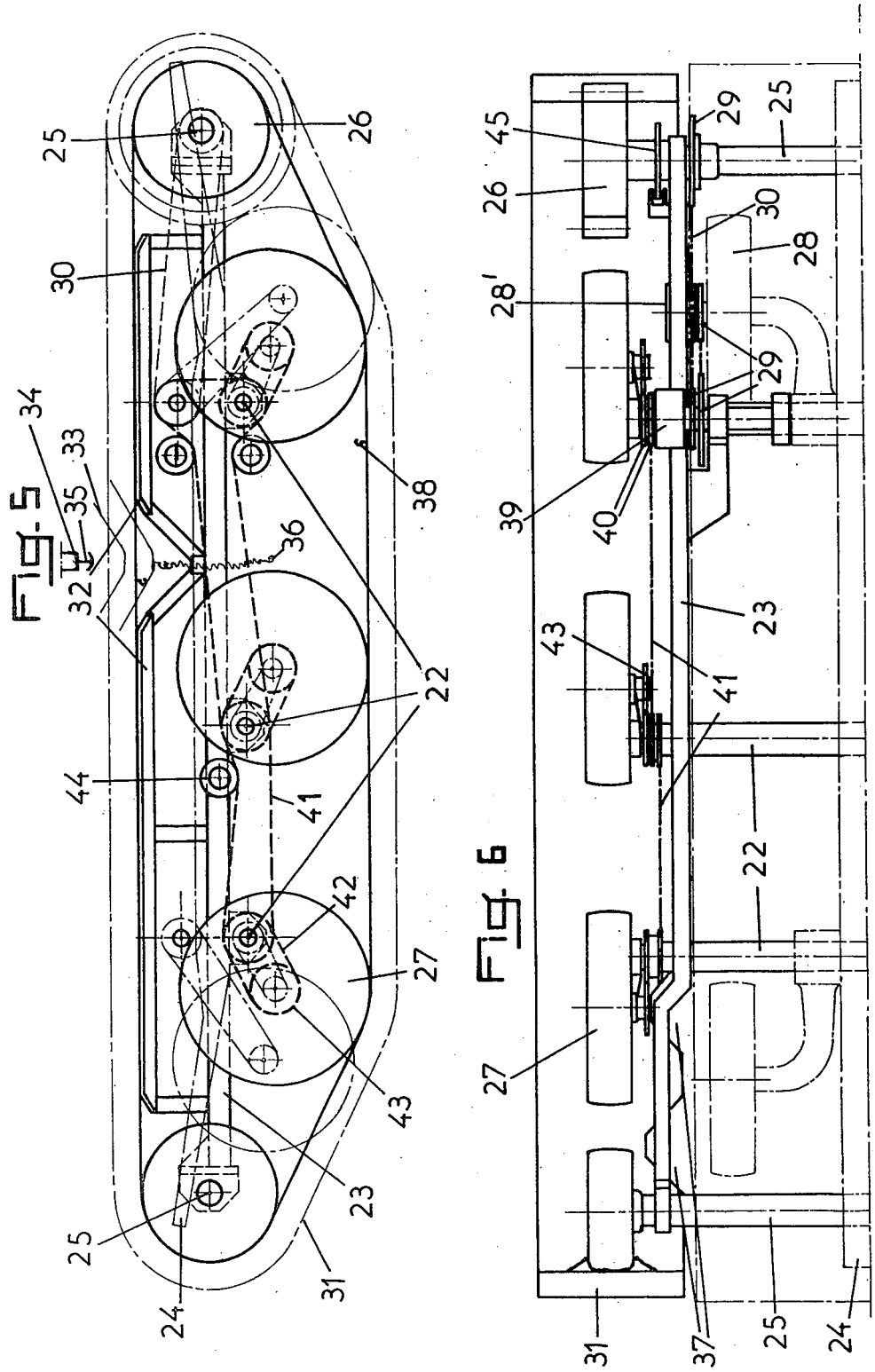

ALL-TERRAIN AND AMPHIBIOUS AUTOMOTIVE VEHICLE

The present invention relates to automotive vehicles, particularly to special vehicles such as all-terrain and/or amphibious vehicles, and has for its object the provision of such a vehicle capable of moving not only on roads but also on loose soil, snow and water, by modification of a conventional automotive vehicle.

At present such vehicles exist, either with endless treads or with more than four wheels, or with wheels and endless treads which are capable of moving not only on firm soil but also on loose soil or on very rough terrain or snow-covered terrain or even on water.

However, these known vehicles are usually adapted for one or at most two of these capabilities and are not useful for the other modes of travel, with the result that they are necessarily limited in their use and cannot be used in all seasons.

It is an object of the present invention to overcome these disadvantages.

Thus, to achieve this object, the present invention provides an all-terrain and amphibious automotive vehicle provided with at least two axles, of which at least one is motor driven, by modifying a standard automotive vehicle, characterized in that the vehicle is provided with independent supplemental wheeled axles which can be raised when not used, and in that an endless track is trained about the wheels on each side of the vehicle. The invention is also characterized in that the motor-driven wheels of the vehicle are provided with tires having a tread cooperating with a corresponding internal tread of the endless tracks. The invention is further characterized in that beneath its chassis, at its forward and rear portions, as well as on its sides, inflatable members are provided which serve as floats.

According to a modified form of the invention, the supplemental axles comprise, with two longitudinal stringers, a subchassis which can be detachably secured beneath the vehicle chassis, the hubs of at least one of the two end axles being provided each with a sprocket driven with speed reduction by the corresponding drive wheel via a clutch and a series of wheels and transmission chains, or pulleys and belts mounted on an elbow, formed by the suspension arm of the corresponding wheel or directly by an independent electric, pneumatic or hydraulic motor for each sprocket wheel.

The invention will be better understood from a reading of the following discription, taken with the accompanying drawings, which illustrate non-limitative examples of the present invention, and in which:

FIG. 4 is a diagrammatic plan view of FIG. 3;

FIG. 5 is a side elevational view of a modified form of vehicle according to the invention; and FIG. 6 is a fragmentary top plan view of the subchassis of the vehicle of FIG. 5.

Figure 1:
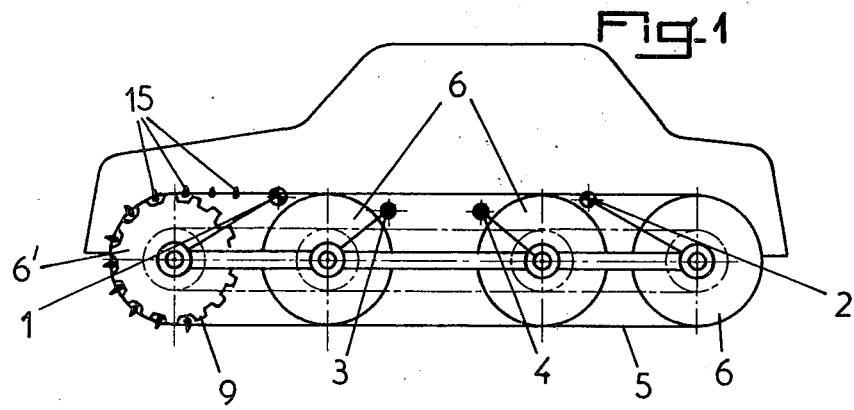
FIG. 1 is a diagrammatic side elevational view of a vehicle according to the present invention.
Figure 2:
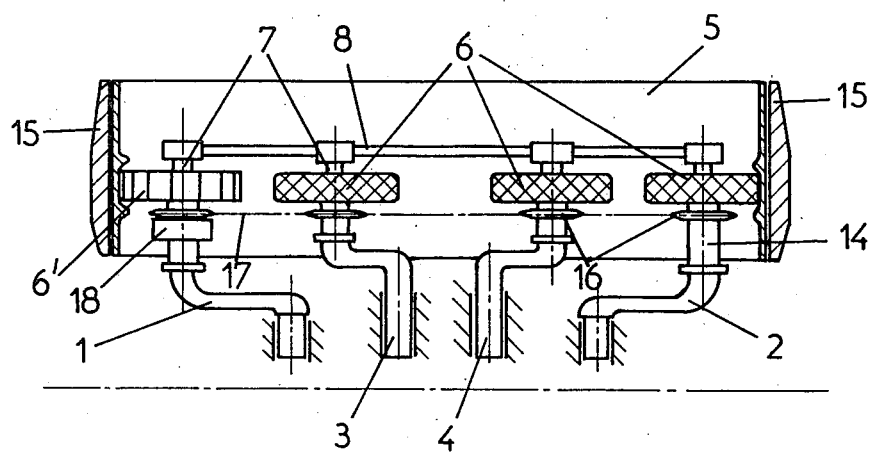
FIG. 2 is a diagrammatic plan view in cross section, showing the arrangement of the axles and the drive of the endless belt and of the wheels.

According to the invention, and as shown more particularly by way of example in FIGS. 1-4 of the accompanying drawings, the all-terrain and amphibious automotive vehicle according to the present invention is provided with two axles 1 and 2 of which axle 1 is motor driven. The vehicle is a converted automobile of otherwise standard form, which accordingly need not be shown or described in detail. It is characterized in that it is provided with supplemental axles 3 and 4 for independent wheels, and in that an endless track 5 is trained about the wheels 6 on each said of the vehicle. The power-driven wheels 6' of the vehicle have each a tire 9, having a tread cooperating with a corresponding tread on the interior of the tracks 5.

For use as an amphibious vehicle, the vehicle according to the invention is also provided, beneath its chassis, at its forward and rear portions, as well as on its sides, with inflatable members 10-13 which serve as floats after inflation.

The supplemental axles 3 and 4 are provided to ensure tensioning of the tracks 5 and to assist the principal axles 1 and 2, and may be raised when out of use, for example when the vehicle is travelling on firm soil, in which case their wheels 6 may be raised so that the vehicle can be used in the form of a conventional automotive vehicle.

So as to achieve better stability, particularly on loose soil, and thus to lower the center of gravity, the width of the vehicle according to the invention may be increased by adding to the hub 7 of each wheel 6 an extension 14.

The tracks 5 are preferably constituted each by a plasticized or rubberized fabric which is reinforced and is provided at regular intervals with crosspieces 15 for improving the traction of the tracks 5 with the soil, or for improving the propulsion on water, and their interior bar for securement on the treads 5 may drivingly cooperate with the tracks of the tires 9 of the motor driven wheels 6'. The tires 9 may preferably be in the form of known pneumatic tires, which are commercially available. The drive may also be effectuated by means of toothed plates (not shown) fixed to wheels 6' and having a profile analogous to that of tires 9 and cooperating with the internal bars of the transverse members 15 which preferably have a longitudinal section which is trapezoidal.

To ensure better transmission of motor torque, the driven wheels 6' may be coupled with other wheels 6 by means of toothed wheels 16 and chains 17 (FIG. 2) as well as by a clutch 18 provided on the drive axle 1. It is also possible to ensure this connection of the wheels by means of pulleys or gear trains, or by means of bevel gears and cardan joints. The drive of the other wheels may also be effected directly by an independent motor for each wheel, or by interconnection of the axles with transmission shaft.

Figure 3:
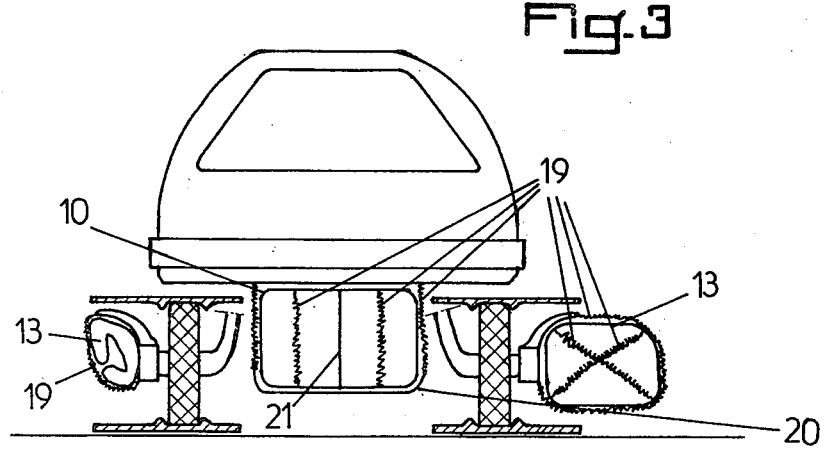
FIG. 3 is a front elevational view of a vehicle according to the invention in raised position, provided with inflatable members, the right-hand inflatable member being inflated and the left-hand inflatable member deflated.

The inflatable elements 10 to 13, shown more particularly in FIGS. 3 and 4, ensure the buoyancy of the vehicle on the water while permitting it to be driven. These elements are generally inflatable by means of a pump, a compressor, or else by bottled gas, and their inflation is effected either simply by means of valves, or else by a venturi tube cooperating with flowing gas to create a suction.

The retraction of these elements 10 to 13 to the non-use position is preferably effected by means of resilient traction elements 19 disposed inside and about the elements 10-13.

To ensure the protection of the central inflatable element 10, there is provided a rigid plate 20, whose edges are raised particularly at the front and the rear, and which holds said element in sandwich fashion between itself and the vehicle chassis itself. Thanks to this arrangement, the bottom of the vehicle is protected, and in the case of sinking, it is possible to assist the propulsion assembly. Moreover, according to another characteristic of the invention, the central inflatable element 10 is preferably constituted by two compartments separated by a central longitudinal wall 21 permitting, by overinflation of one of these compartments, the raising of the associated wheels and/or track, so that the work of mounting and dismounting as well as servicing, are facilitated.

In the fully tracked embodiment shown in FIGS. 1–4, the steering of the vehicle is effectuated in known manner by braking one or more drive wheels on one side, for example by means of known control lever mechanism, or else by means of a special steering wheel.

According to another characteristic of the invention, shown in FIGS. 3 and 4, the wheels 6 may also be disposed beneath the vehicle chassis, so as to raise the latter and to obtain a narrow span, as well as to obtain, in the case of amphibious use, a further raising of the passenger compartment relative to the water level.

For maneuvering on water, it is possible to provide the vehicle with a well for mounting an outboard motor, or with a helical screw.

FIGS. 5 and 6 show a modified form of the invention, in which the supplemental axles 22 and 25 constitute with two longitudinal members 23 a sub-chassis, which may be detachably mounted under the chassis 24 (shown in dot-dash lines). On the ends of this sub-chassis are mounted axles 25 whose axes are higher than those of axles 22 and of which at least one is provided with sprocket wheels 26 driven at a reduced gear ratio by the corresponding driven wheel 28 of the vehicle by means of a clutch 28' and a series of sprocket wheels 29 and transmission chains 30, the axis of one sprocket wheel 29 coinciding with that of the axle of the driven wheel 28, so that movement of the motor-driven wheel will not change the tension in the transmission chains. The drive may also be effectuated by means of pulleys and belts, or by bevel gears with a telescopic shaft, or directly by an independent electric, pneumatic or hydraulic motor for each gear wheel 26.

The wheels 27 and axles 22 are independently suspended, and the axles 22 may be pivoted between their use and non-use positions on the sub-chassis by a lockable swinging device known per se.

In the all-terrain arrangement in which the endless treads are used, the tread 31, extending about the wheels 27 and the sprockets 26, is tensioned by those wheels 27, and has a longitudinal trapezoidal cross section permitting better penetration into deep snow or very loose soil, as well as unsupported stretches between the wheels which permit the lower surface of the track to follow the contour of the ground. Moreover, in this position, the upper part of the track 31 is supported by longitudinal sliding supports 32. These supports 32 have, between two axles 22, a space permitting the passage of the tensioner 33 of the tread 31 in raised position from the latter (shown in fine lines in FIG. 5). Moreover, in case of utilization as an amphibious vehicle, the supports 32 serve for the securement of the floats.

To retract the tensioner when the treads are not used, there is provided, according to the invention, a device 34 that bears on the treads from above between two wheels 27, such as a jack, cooperating with positioning detents 35 for the tread, these detents being adapted to be controlled manually or by jacks; and an auxiliary device for retracting the tensioner, such as an elastic element 36, or a mechanical tensioner, may also be secured between the portions of the tracks 31.

The axles 25 are secured detachably on the sub-chassis, with tensioning device permitting adjustment of the tension of the transmission chain 30 and of the track 31.

In non-use position, one or two recesses 37 provided in tracks 31 permit the free orientation of the steering wheels, and these recesses may be adjusted as to position thanks to two reference marks 38 provided on the inner face of each track, and which are brought into correspondence at the level of connection of the belt tensioner, these reference marks being adapted to be combined with means for anchoring the element 36, or the like.

According to a modified form of the invention, for all-terrain use without tracks, which is to say that the tracks 31 are removed, the wheels 27 are driven by means of a clutch 39 and a set of twinned chain wheels 40 of which one is controlled by a set of chains 41 driven by means of transmission clutch 39 by the motor shaft, and the other is connected by chain 42 to a chain wheel 43 fixed to wheel 27, the transmission chains 41 being tensioned by means of tensioners 44, and the intermediate wheels 27 remaining completely independent (FIG. 5).

According to another characteristic of the invention, axle 25 of sprocket wheels 26 forming the driven shaft is preferably provided with disc or drum brakes 45 which can be separately actuated, from the driver's station, thereby permitting steering of the vehicle as an all-terrain vehicle, and serving as a back-up brake in case the driven chain breaks.

According to another characteristic of the invention, the hubs of the supplemental wheels 27 and the hubs of the sprocket wheels 26 may be provided with multiple wheels or tired wheels which are very wide for increasing the contact surface with the ground, or to increase the buoyancy and propulsion on water.

Thanks to the invention, it is possible to provide a multi-use vehicle which can be used in a continuous manner no matter what the terrain conditions by simple raising or lowering of supplemental wheels, and/or inflation or deflation of inflatable elements, and/or addition or subtraction of various accessory means such as endless tracks.

Moreover, it is possible to provide such a vehicle by addition of accessory devices, such as supplemental axles, tracks, inflatable elements and auxiliary transmission elements, to the infrastructure of a conventional automotive vehicle, particularly by simple provision of a sub-chassis beneath the existing chassis without modifying the existing superstructure.

Of course, the invention is not limited to the embodiments described and shown; and modifications and variations are possible, within the scope of the present invention. Such modifications and variations are considered to be within the purview of the invention as defined by the appended claims.

What is claimed is:

1. In an all-terrain and amphibious vehicle having an elongated chassis and at least two axles of which at least one is power driven and has power-driven wheels, and other wheels and an endless track trained about said power-driven wheels and said other wheels on each side of the vehicle, and inflatable members secured to the chassis along its longitudinal edges and at the front and the rear of the chassis; the improvement in which said vehicle is provided by conversion of a standard automotive vehicle, said vehicle having additional axles on which are mounted said other wheels which can be raised and are removable in case of non-use, and a further inflatable element directly beneath the chassis adapted to serve as a float for the vehicle, means interconnecting said power-driven wheels with said other wheels for conjoint rotation, and means to brake at least one of said power-driven wheels to steer the vehicle by driving.

2. A vehicle according to claim 1, in which the means interconnecting said power-driven wheels with said other wheels comprises sprockets and transmission chains as well as a clutch on said power driven axle.

3. A vehicle according to claim 1, in which said means interconnecting said power-driven wheels with said other wheels comprise pulleys.

4. A vehicle according to claim 1, in which said inflatable members are retracted when deflated by elastic members associated with said inflatable members.

5. A vehicle as claimed in claim 1, in which said inflatable member directly beneath the chassis is in the form of two compartments separated by a central longitudinal wall.

6. A vehicle according to claim 1, in which said additional axles coact with two longitudinal members to constitute a sub-chassis adapted to be removably secured below the chassis of the vehicle, the hubs of at least one of the two end axles of said sub-chassis each havine a sprocket driven with reduced gear ratio by a power-driven wheel via a clutch and a set of transmission chain wheels and transmission chains for each sprocket.

7. A vehicle according to claim 6, in which each track has a longitudinal support on which it slides, said support having, between two said axles, a gap permitting the passage of a tensioner for the endless track in the non-use position of the latter, said supports serving also for the securement of floats for the amphibious use of the vehicle, and means for advancing and retracting the tensioner between its use and non-use positions.

8. A vehicle according to claim 6, in which said driven axle is mounted on said longitudinal members by means permitting adjustment of the tension in the transmission chain, a non-powered end axle being mounted on the sub-chassis so as to permit regulation of the tension of the tracks.

9. A vehicle according to claim 6, in which said tracks have at least one recess to permit passage of the wheels, and reference marks on the tracks to permit orientation of the tracks in a position in which the wheels can pass through said recesses.

10. A vehicle as claimed in claim 6, said end in which axle having the sprockets is provided with a brake for steering the vehicle.

* * * * *